Feb. 28, 1933. V. GRAZIANI 1,899,801
ANTISKID CHAIN FOR PNEUMATIC TIRES
Filed Feb. 27, 1932
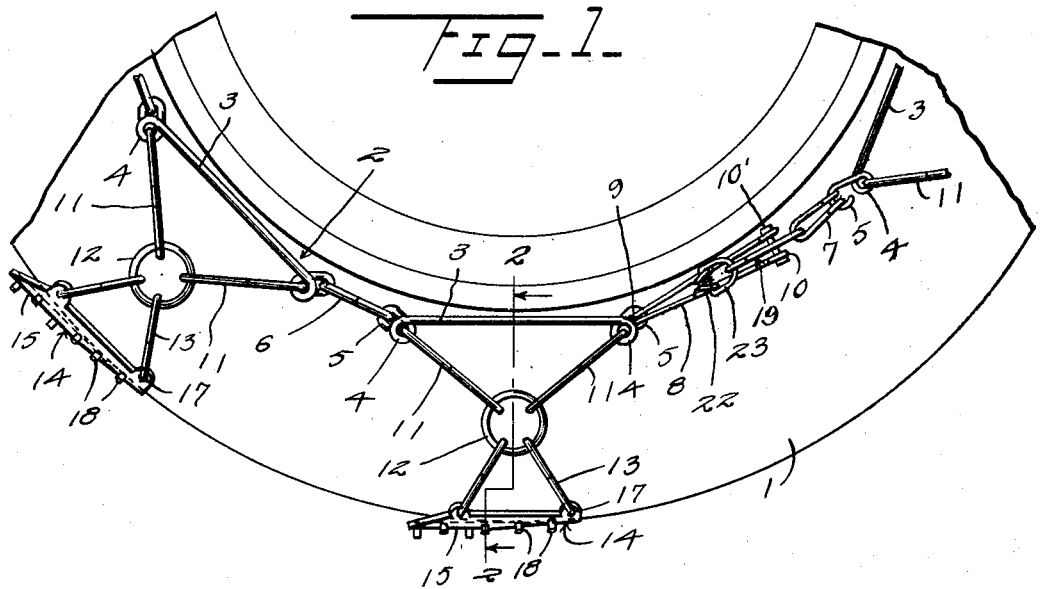
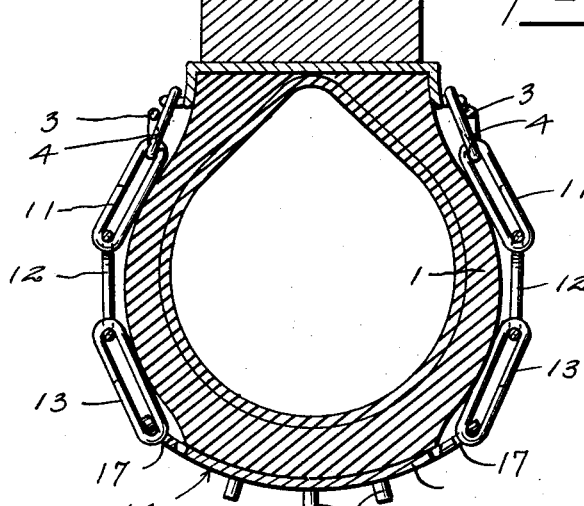
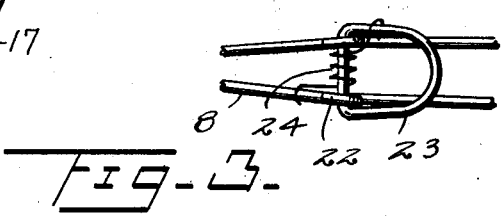
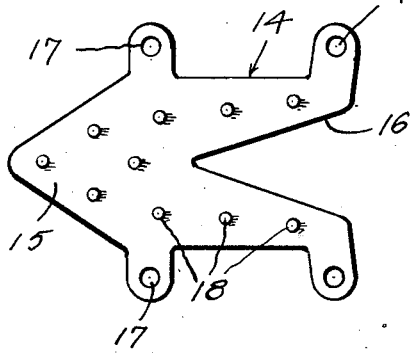
Inventor
V. Graziani
By Watson E. Coleman
Attorney Patented Feb. 28, 1933

1,899,801

UNITED STATES PATENT OFFICE

VINCENZO GRAZIANI, OF DETROIT, MICHIGAN

ANTISKID CHAIN FOR PNEUMATIC TIRES

Application filed February 27, 1932. Serial No. 595,599.

This invention relates to improvements in anti-skid chains for pneumatic tires and pertains particularly to a chain for a series of traction plates associated therewith.

The primary object of the present invention is to provide an anti-skid device for pneumatic tires having a new and novel form of surface gripping plate associated therewith which operates to materially improve the traction of the tire and in addition is so designed that particles of matter will not pack between it and the tire tread.

Another object of the invention is provide an anti-skid chain having an improved type of side strands with which the traction plates overlying the tread of the tire are coupled.

A still further object of the invention is to provide, in a manner as hereinafter pointed out, a new and novel means for coupling the ends of the side chain strands of the device.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a view in side elevation of a portion of the pneumatic tire equipped with the anti-skid device embodying the present invention;

Figure 2 is a view in transverse section taken on the line 2—2 of Figure 1;

Figure 3 is a plan view of the face of one of the traction plates;

Figure 4 is a detail view in side elevation of the coupling between the ends of a side chain or strand;

Figure 5 is a detail view upon an enlarged scale of the link holding loop.

Referring now more particularly to the drawing wherein like numerals of reference indicate corresponding parts throughout the several views, the numeral 1 indicates generally a portion of the motor vehicle tire of the pneumatic type upon which the anti-skid device or chain embodying the present invention is shown mounted.

The present invention comprises a pair of side strands or chains each of which is indicated generally by the numeral 2 which are designed to be located around the rim of the wheel upon which the tire is mounted, or adjacent thereto and concentric therewith, and each of these strands is made up of a series of relatively long bar members 3 each of which is formed at each end to provide an eye 4 and the end is then extended and formed into a hook 5, the bill of which is turned back toward the eye, as is clearly shown in Figure 1.

The hooks 5 also extend obliquely of the bar 3 and away from that side thereof from which the eye 4 projects. When the chain is in use the eyes 4 of the bars 3 extend from the bars in the direction of the tread of the tire while the hooks 5 are directed rearwardly therefrom toward the rim of the wheel on which the tire is mounted.

With the exception of the ends of the strands 2 each pair of bars 3 is connected by a single link member 6 through which the hooks 5 of the adjacent bar ends pass.

The ends of the strand 2 are connected by a special hook mechanism, one end having attached to the hook 5 of the bar 3 the short loop 7, while the opposite bar 3 has attached thereto the relatively long link 8. The link 8 is formed of two side members which terminate at their ends in the eyes 9 and 10. The eyes 9 at one end of the link are engaged by the adjacent hook 5 while the eyes 10 have extended therethrough the pin 10' upon which is pivotally mounted the elongated double hook element 19, one hook portion being represented by the numeral 20 which may be referred to as the deep hook while the other hook portion is indicated by the numeral 21 and will be referred to as the bill hook. Intermediate its ends the link 8 has each side member formed to provide an eye 22 and these eyes have extended therethrough and transversely of the link a portion of a ring 23 with which the bill hook 21 is adapted to be connected in the manner illustrated in Figure 4. The portion of the ring 23 which extends across the link 8 has a spring 24 thereon, one end of which engages the chain link while the other end is connected with the link. This spring normally urges the ring down against the adjacent link and thus serves to hold it in connection with the bill hook 21 when the coupling mechanism is in use to connect together the ends of the side chain.

The manner of coupling the ends of the side chain by means of the latching mechanism just described will be readily apparent from examination of Figures 1 and 4 wherein it will be seen that the initial step in connecting the adjacent end bars 3 of the strand or chain is to swing the double hook element 19 forwardly so that the free end portion or bill hook 21 may be extended through the link 7 and then by swinging the double hook back in the reverse direction on the pivot pin 10′ this link will be caused to slide in the deep hook portion 20 and the bill hook 21 will be brought into position to have the ring 23 engaged thereover. The spring 24 will maintain the ring in this position and thus prevent accidental disconnection of the chain.

The two eyes 4 of each strand bar 3 have connected therewith the elongated side links 11 which are connected together by a ring 12 and this ring also has connected therewith two additional long links 13 which are connected at spaced points to a traction plate which is indicated generally by the numeral 14. Each of these traction plates 14 comprises an elongated body which is slightly arcuate transversely as illustrated in Figure 2 and which at one end tapers to a point 15, while its other end has a relatively deep V-shaped recess 16 cut therein. Each side of the plate 14 has a pair of apertured ears 17 formed integral therewith and extending therefrom and it is with each of these apertured ears that one of the second mentioned long links 13 connects when the plate is in position against the tread of the tire.

As shown, each plate 14 is provided with a series of short pins 18 in its convex face, which pins assist in giving traction to the tire by penetrating the surface of the ground or ice or snow over which the tire may be moving.

In practice, the anti-skid device is so placed on the tire as to have the pointed ends 15 of the traction plates extending in a direction opposite to the direction in which the tire is turning. This brings the V-shaped or cut-out portion of the plate against the tire just before the plate leaves the ground and in this manner any snow, ice or mud which finds its way between the plate and the tire will escape.

From the foregoing description it will be readily apparent that the anti-skid device herein described is of extremely simple construction but may be strong and durably made and will efficiently operate for the purpose intended. It will also be seen that the improved coupling means for the ends of the side strands 2 is of a simple nature and may, therefore, be readily manipulated for connecting and disconnecting the ends of the strands.

Having thus described the invention, what is claimed is:—

1. An anti-skid device for pneumatic tires, comprising a plurality of traction elements designed to be disposed circumferentially of the tread of a tire and in spaced relation, an annular strand for disposition upon either side of the tire and each comprising a series of bar elements each terminating in an eye at each end and a hook forming a continuation of each eye, links connecting the adjacent hooks of the bar members, and connecting means between the eyes of each bar member and the adjacent side of a traction element.

2. An anti-skid device for pneumatic tires, comprising a plurality of traction elements designed to be disposed circumferentially of the tread of a tire and in spaced relation, an annular strand for disposition upon either side of the tire and each comprising a series of bar elements each terminating in an eye at each end and a hook forming a continuation of each eye, connecting means between the adjacent hooks of the bar members, a link connected with each eye of each bar member, a pair of links connected with each side of a traction element, a ring coupling the links engaging the eye of the bar with the adjacent pair of links connected with the traction element, said strands being separated at one point forming two ends, and means for coupling said ends of each strand together.

In testimony whereof I hereunto affix my signature.

VINCENZO GRAZIANI.